United States Patent
Dardona et al.

(10) Patent No.: US 11,155,023 B2
(45) Date of Patent: Oct. 26, 2021

(54) STRETCHING AND DEPLOYMENT OF A SENSOR NETWORK FOR LARGE STRUCTURE MONITORING

(71) Applicant: Rohr, Inc., Chula Vista, CA (US)

(72) Inventors: Sameh Dardona, South Windsor, CT (US); Dustin D. Caldwell, Portland, CT (US)

(73) Assignee: Rohr, Inc., Chula Vista, CA (US)

( * ) Notice: Subject to any disclaimer, the term of this patent is extended or adjusted under 35 U.S.C. 154(b) by 238 days.

(21) Appl. No.: 16/240,282

(22) Filed: Jan. 4, 2019

(65) Prior Publication Data
US 2020/0215744 A1 Jul. 9, 2020

(51) Int. Cl.
*B64F 5/10* (2017.01)
*B29L 31/34* (2006.01)
*B29C 55/16* (2006.01)

(52) U.S. Cl.
CPC ............ *B29C 55/165* (2013.01); *B29C 55/16* (2013.01); *B64F 5/10* (2017.01); *B29L 2031/34* (2013.01)

(58) Field of Classification Search
CPC ......... B29C 55/02; B29C 55/12; B29C 55/16; B29C 55/165; B29C 55/20; B64F 5/10; B29L 2031/34; G01M 5/00
See application file for complete search history.

(56) References Cited

U.S. PATENT DOCUMENTS

| | | | | |
|---|---|---|---|---|
| 1,392,123 A | * | 9/1921 | Danisi | D05C 9/12 38/102.5 |
| 2,759,217 A | * | 8/1956 | Peterson | B29C 55/10 38/102.4 |
| 2,918,696 A | * | 12/1959 | Bottoms | B29C 55/165 264/291 |
| 3,482,343 A | * | 12/1969 | Hamu | B41F 15/36 38/102.5 |
| 3,553,862 A | * | 1/1971 | Hamu | B41F 15/36 38/102.1 |

(Continued)

FOREIGN PATENT DOCUMENTS

| | | |
|---|---|---|
| CN | 102593576 B | 4/2014 |
| CN | 105643792 B | 12/2017 |
| JP | 2011212926 | 10/2011 |

OTHER PUBLICATIONS

EP search report for EP212392.5 dated Jun. 2, 2020.

(Continued)

*Primary Examiner* — Jeffrey M Wollschlager
(74) *Attorney, Agent, or Firm* — Getz Balich LLC

(57) ABSTRACT

A tool comprises a first rod that extends along a first axis and moves perpendicular to the first axis along a second axis. A first sliding guide moves along the first rod. A second rod extends parallel to the second axis and moves perpendicular to the second axis and parallel to the first axis, and a second sliding guide moves along the second rod. A third rod extends along a third axis and moves perpendicular to the third axis and parallel to the second axis, and a third sliding guide moves along the third rod. A fourth rod extends along a fourth axis and moves perpendicular to the fourth axis and parallel to the first axis, and a fourth sliding guide moves along the fourth rod. The periphery of the sensor network film is secured to the rods, and the rods and guides move simultaneously to stretch the film.

11 Claims, 8 Drawing Sheets

(56) References Cited

U.S. PATENT DOCUMENTS

| | | | |
|---|---|---|---|
| 3,600,746 A * | 8/1971 | Kostur | B29C 55/165 26/1 |
| 3,776,028 A * | 12/1973 | Lynch | G01N 3/10 73/819 |
| 4,625,440 A * | 12/1986 | Dang | C25B 9/77 38/102.5 |
| 4,685,230 A * | 8/1987 | Mason, III | D06C 3/08 264/291 |
| 5,113,611 A * | 5/1992 | Rosson | B44D 3/185 101/127.1 |
| 5,748,209 A | 5/1998 | Chapman | |
| 5,905,205 A * | 5/1999 | Clay | G01N 3/08 73/856 |
| 5,937,751 A * | 8/1999 | Newman, Jr. | B41F 15/36 101/127.1 |
| 6,010,771 A | 1/2000 | Isen | |
| 6,233,817 B1 | 5/2001 | Ellis | |
| 6,356,455 B1 | 3/2002 | Carpenter | |
| 6,487,902 B1 * | 12/2002 | Ghosh | G01L 5/045 73/159 |
| 6,666,810 B1 | 12/2003 | Roeters et al. | |
| 7,204,160 B1 * | 4/2007 | Sadegh | G01N 3/10 73/862.041 |
| 7,284,481 B2 * | 10/2007 | Kasuya | B41F 15/36 101/127.1 |
| 8,013,348 B2 | 9/2011 | Kishioka | |
| 9,482,604 B2 * | 11/2016 | Campbell | G01N 3/08 |
| 9,832,875 B2 | 11/2017 | Culp et al. | |
| 2007/0170301 A1 * | 7/2007 | Morello | B65H 16/021 242/557 |
| 2007/0290217 A1 | 12/2007 | Daniels | |
| 2011/0122587 A1 | 5/2011 | Deming et al. | |
| 2011/0131904 A1 | 6/2011 | Leconte | |
| 2012/0004555 A1 | 1/2012 | Ohnuma et al. | |
| 2014/0191378 A1 | 7/2014 | Lee | |
| 2016/0007473 A1 | 1/2016 | Dardona et al. | |
| 2017/0355129 A1 * | 12/2017 | McGraw | A47C 5/06 |
| 2018/0068808 A1 * | 3/2018 | Wang | H01H 13/14 |
| 2018/0317322 A1 | 11/2018 | Schmidt et al. | |

OTHER PUBLICATIONS

Guo, et al, Functionalization of stretchable networks with sensors and switches for composite materials, Structural Health Monitoring 2018, vol. 17(3), p. 598-623.

Chen, et al, Development of a Multifunctional Stretchable Sensor Network for Smart Structures, In the Proceedings of the 11th International Workshop on Structural Health Monitoring, Sep. 12-14, 2017 at Stanford, CA USA, p. 712-720.

Chen, et al, Characterization of Distributed Microfabricated Strain Gauges on Stretchable Sensor Networks for Structural Applications, Sensors 2018, 18, 3260, p. 1-14, MDPI, Basel, Switzerland.

* cited by examiner

STRETCHING AND DEPLOYMENT OF A SENSOR NETWORK FOR LARGE STRUCTURE MONITORING

This invention was made with Government support under 6.E17.0001 awarded by the United States Air Force. The Government has certain rights in this invention.

BACKGROUND OF THE INVENTION

1. Technical Field

The present disclosure relates to a tool that can used to stretch a sensor network film during manufacturing of a sensor network.

2. Background Information

Structure monitoring is a critical safety factor for a wide variety of aerospace and commercial assets, including aircraft components and automotive vehicles. In aerospace platforms, for example, accidents may occur due to structural fatigue and impact damage. Use of newer, lightweight materials including composites introduces new failure mechanisms in aircraft and automotive structures, such as for example delamination, which require additional vigilance with respect to structural integrity. Structural monitoring capabilities are therefore desirable to meet the challenges of future aircraft and other structures.

Stretchable sensor networks can conformably distribute sensors, actuators and electronics over large structural areas, provide instantaneous information on the structural integrity of the structure and can effectively measure environmental conditions for optimum performance while adding relatively low weight. In addition, these sensors allow real-time feedback of performance, which has far reaching implications into how future structures (e.g., aerospace structures) are built.

Sensor networks to sense pressure, temperature, strain or impact have been demonstrated as shown in FIG. 1. A challenge in developing a stretchable sensor network is the optimized placement of sensors and actuators onto a substrate (e.g., film) to ensure that the structural health monitoring system functionalities can be accurately utilized. The sensors need to be placed at an optimum distance on the film such that the sensor and actuator signals do not overlap. The current practice is generally to manually stretch the film and apply a fabricated sensor layer, which results in a relatively low yield, and as a result a time intensive and relatively expensive manufacturing process. There is a need for a tool to improve the manufacturing process.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a tool for stretching a sensor network film. The tool comprises a first rod that extends along a first axis and at a first distal end is secured to a first drive motor that is slidingly secured to a base surface to move perpendicular to the first axis and parallel to a second axis. A first idler pulley is connected to a first proximate end of the first rod. A first sliding guide moves along the first axis on the first rod, where the first drive motor drives a first drive pulley that is drivingly connected to the first idler pulley to move the first sliding guide along the first axis on the first rod. A second rod extends along the second axis and at a second distal end is secured to a second drive motor that is slidingly secured to the base surface to move perpendicular to the second axis and parallel to the first axis. A second idler pulley is connected to a second proximate end of the second rod. A second sliding guide moves along the second axis on the second rod, where the second drive motor drives a second drive pulley that is drivingly connected to the second idler pulley to move the second idler pulley and the second sliding guide along the second axis on the second rod, where the first idler pulley is secured to and moves with the second slide guide. A third rod extends along a third axis and at a third distal end is secured to a third drive motor that is slidingly secured to the base surface to move perpendicular to the third axis and parallel to the second axis. A third idler pulley is secured to a proximate end of the third rod. A third sliding guide moves along the third axis on the third rod, where the third drive motor drives a third drive pulley that is drivingly connected to the third idler pulley to move the third idler pulley and the third sliding guide along the third axis on the third rod, where the second idler pulley is secured to and moves with the third sliding guide. A fourth rod extends along a fourth axis and at a fourth distal end is secured to a fourth drive motor that is slidingly secured to the base surface to move perpendicular to the fourth axis and parallel to the first axis. A fourth idler pulley is secured to a proximate end of the fourth rod and that is secured to and moves with the first sliding guide. A fourth sliding guide moves along the fourth axis on the fourth rod, where the fourth drive motor drives a fourth drive pulley that is drivingly connected to the fourth idler pulley to move the fourth idler pulley and the fourth sliding guide along the fourth axis on the fourth rod, where the third idler pulley is secured to and moves with the fourth sliding guide. The first axis and the third axis are parallel, and the third axis and the fourth axis are parallel. A plurality of clips are mounted to each of the first, second, third and fourth rods to hold the sensor network film at its periphery.

Each of the first, second, third and fourth drive motors may comprise a stepper motor.

Each of the first, second, third, fourth rods may be positioned in a common plane to stretch the sensor network film in the common plane.

A first drive belt may be coupled between the first drive motor and the first idler pulley to move the first sliding guide along the first rod.

A second drive belt may be coupled between the second drive motor and the second idler pulley to move the second sliding guide along the second rod.

An associated spacing spring located between immediately adjacent ones of the clips on the same of the first, second, third and fourth rods to spread the clips out on its associated on the first, second, third and fourth rods as the sensor film is stretched by moving each of the first, second, third and fourth sliding guides in the direction of its associated one of the first, second, third, fourth distal ends.

Aspects of the disclosure are also directed to a tool for stretching a sensor network film that comprises a first rod that extends along a first axis and moves perpendicular to the first axis and along a second axis. A first sliding guide moves along the first axis on the first rod. A second rod extends parallel to the second axis and moves perpendicular to the second axis and parallel to the first axis, and a second sliding guide moves along the second axis on the second rod. A third rod extends along a third axis and moves perpendicular to the third axis and parallel to the second axis, and a third sliding guide moves along the third axis on the third rod. A fourth rod extends along a fourth axis and moves perpendicular to the fourth axis and parallel to the first axis, and a fourth sliding guide moves along the fourth axis on the fourth rod. The first axis and the third axis are parallel, and the second axis and the fourth axis are parallel. The sensor network film is attached at its periphery to each of the first, second, third and fourth rods, and the first, second, third and fourth rods and the first, second, third and fourth sliding guides move simultaneously to stretch the sensor network film.

A plurality of clips may be mounted to each of the first, second, third and fourth rods to hold the sensor network film at its periphery, and a plurality of spacing springs may be each uniquely located between adjacent ones of the clips on the same of the first, second, third and fourth rods to spread the clips out on its associated one the first, second, third and fourth rods as the sensor film is stretched by moving each of the first, second, third and fourth sliding guides and the first, second, third and fourth rods to stretch the sensor network film.

A motor may simultaneously move each of the first, second, third and fourth rods and the first, second, third and fourth sliding guides to stretch the sensor network film.

A controller may provide command signals to a plurality of motors that simultaneously move each of the first, second, third and fourth rods and the first, second, third and fourth sliding guides to stretch the sensor network film.

Each of the plurality motors may comprise one of a stepper motor and a torque motor.

Each of the first, second, third, fourth rods may be positioned in a common plane to stretch the sensor network film in the common plane.

The motor may comprise at least one of a stepper motor and torque motor.

Each of the first, second, third and fourth sliding guides may include their own guide movement motor in order to control movement of the first, second, third and fourth sliding guides along its associated rod.

Each of the first, second, third and fourth rods may include their own rod movement motor in order to control movement of the first, second, third and fourth rods.

Aspects of the disclosure are also directed to stretching a sensor network film, comprising providing a first rod that extends along a first axis and moves perpendicular to the first axis and along a second axis, providing a first sliding guide that moves along the first axis on the first rod, providing a second rod that extends parallel to the second axis and moves perpendicular to the second axis and parallel to the first axis, providing a second sliding guide that moves along the second axis on the second rod, providing a third rod that extends along a third axis and moves perpendicular to the third axis and parallel to the second axis, providing a third sliding guide that moves along the third axis on the third rod, providing a fourth rod that extends along a fourth axis and moves perpendicular to the fourth axis and parallel to the first axis, providing a fourth sliding guide that moves along the fourth axis on the fourth rod. The sensor network film is attached at its peripheral edges to each of the first, second, third and fourth rods within a perimeter formed by the first, second, third and fourth sliding guides on the first, second, third and fourth rods. The first, second, third and fourth rods and the first, second, third and fourth sliding guides are moved in unison to stretch the sensor network film.

The sensor network film may be attached by providing a plurality of clips mounted to each of the first, second, third and fourth rods to hold the sensor network film at its periphery, and providing a plurality of spacing springs each uniquely located between adjacent ones of the clips on the same of the first, second, third and fourth rods to spread the clips out on its associated one of the first, second, third and fourth rods as the sensor film is stretched by moving each of the first, second, third and fourth sliding guides and the first, second, third and fourth rods to stretch the sensor network film.

A motor may be provided that moves each of the first, second, third and fourth rods and the first, second, third and fourth sliding guides to stretch the sensor network film.

A controller may be provided that issues command signals to a plurality of motors that move each of the first, second, third and fourth rods and the first, second, third and fourth sliding guides in unison to stretch the sensor network film.

Each of the first, second, third, fourth rods may be positioned in a common plane so the step of moving stretches the sensor network film in the common plane.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
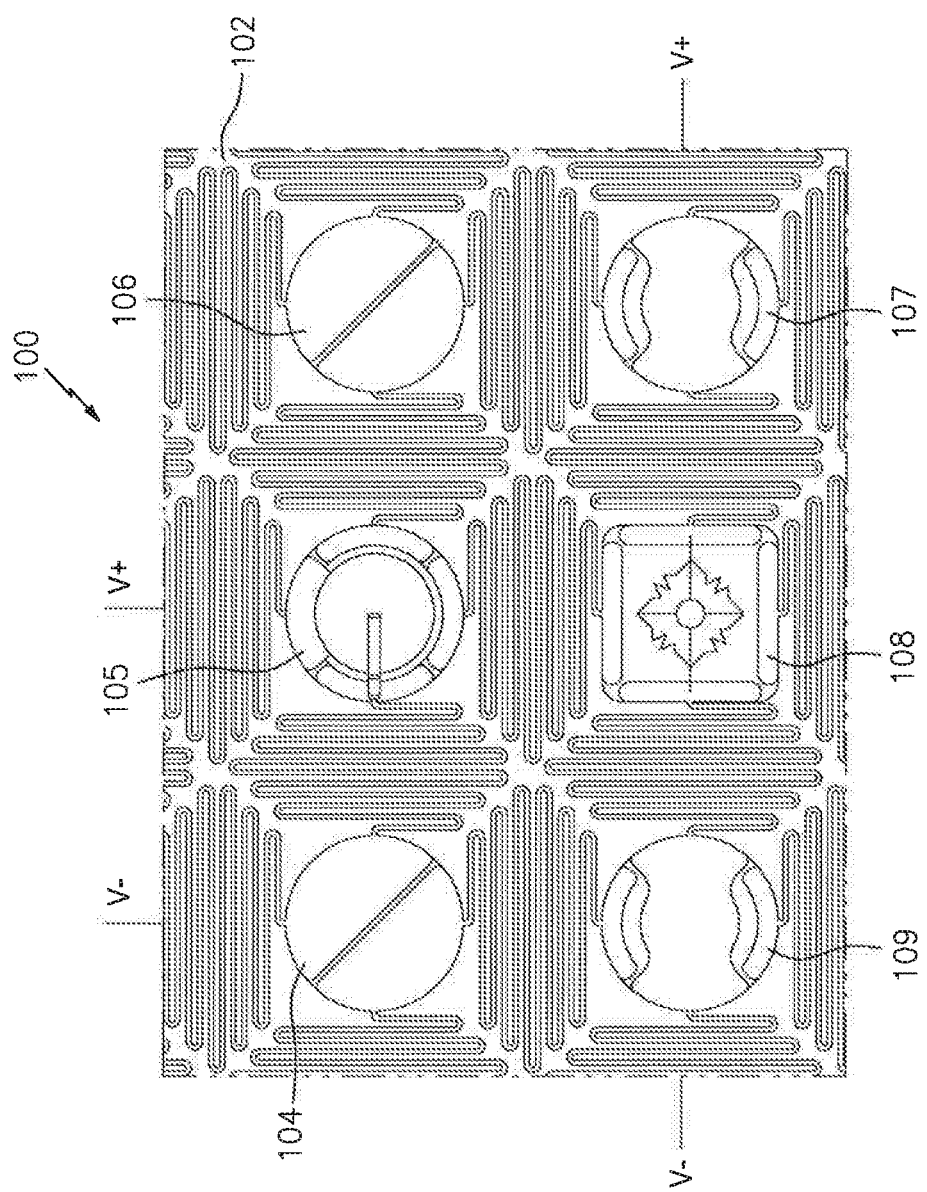
FIG. 1 is a pictorial illustration of a stretchable sensor network.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

FIG. 1 is a pictorial illustration of a stretchable sensor network 100, which may include a film 102. The film 102 may be, for example, a flexible polyimide material, a polyester film, a fluoropolymer, a copper foil film or an epoxy glass film. To manufacture a sensor network, the film 102 is stretched and components (e.g., sensors, integrated circuits, et cetera) are placed at various node locations 104-109 of the film 102. See U.S. Patent Application No. 2018/0317322 which is assigned to the assignee of the present invention and incorporated herein by reference. To stretch the film 102 the film may be placed into a stretching tool.

Figure 2:
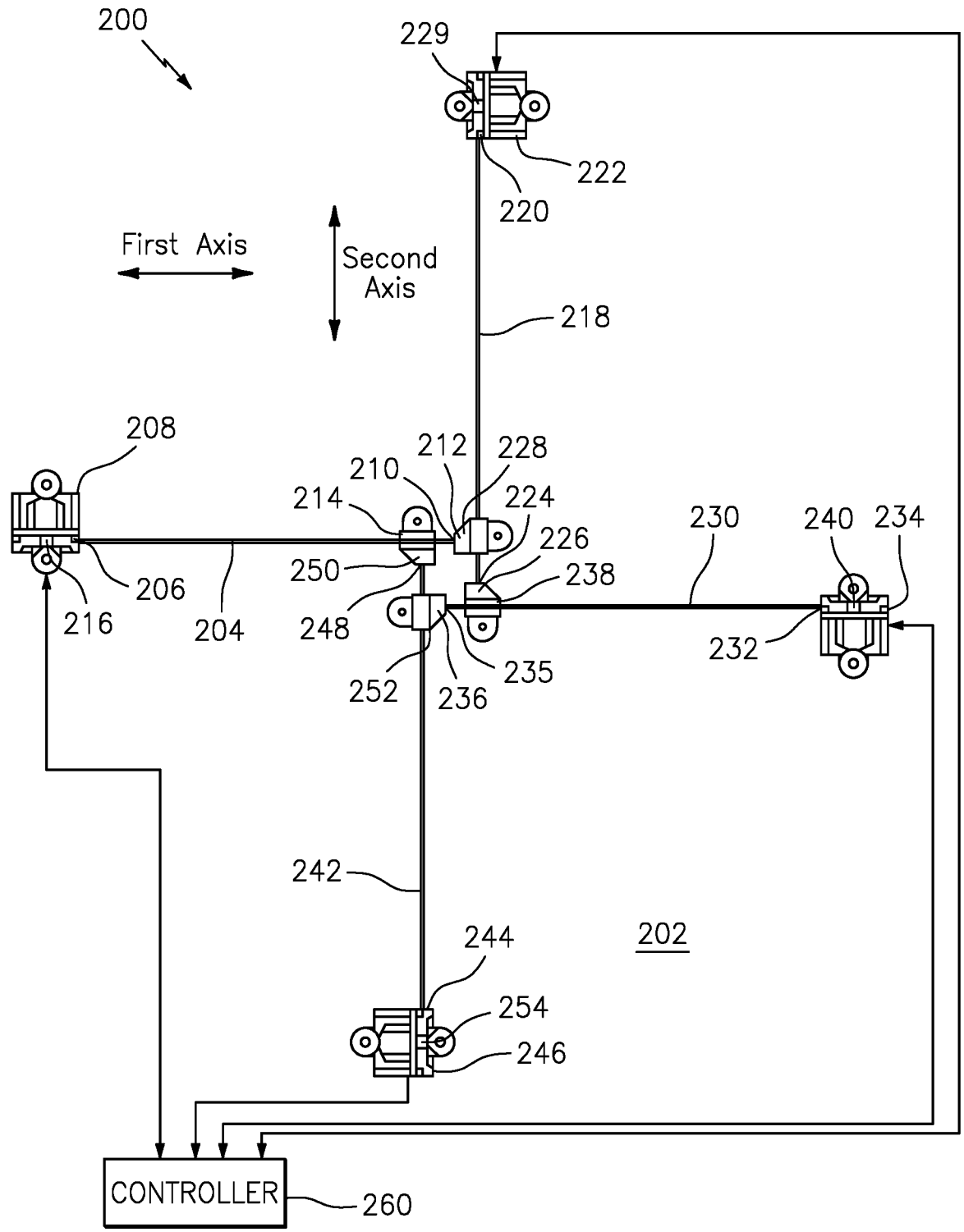
FIG. 2 is a simplified pictorial illustration of a stretching tool mounted on a base surface in a closed position.

FIG. 2 is a simplified pictorial illustration of a stretching tool 200 mounted on a base surface 202 and in a closed position. The tool 200 includes a first rod 204 that extends along a first axis and at a first distal end 206 is secured to a first drive motor 208. The first drive motor 208 is slidingly secured to the base surface 202 to move perpendicular to the first axis and parallel to a second axis. The first rod 204 also includes a first proximate end 210 that is secured to a first idler pulley 212. A first sliding guide 214 moves along the first axis on the first rod 204 under the control of a first belt (not shown in FIG. 2) that extends between the first drive motor 208 and the first idler pulley 212. The first idler pulley 212 is secured to and moves with a second sliding guide 228. The first drive motor 208 drives a first drive pulley 216 that is drivingly connected to the first idler pulley 212 via the first belt (not shown in FIG. 2) to move the first sliding guide 214 along the first axis on the first rod 204.

The tool 200 also includes a second rod 218 that extends along the second axis and at a second distal end 220 is secured to a second drive motor 222. The second drive motor 222 is slidingly secured to the base surface 202 to move perpendicular to the second axis and parallel to the first axis. The second rod also includes a second proximate end 224 is secured to a second idler pulley 226. The second idler pulley 226 is secured to and moves with a third sliding guide 238. The second sliding guide 228 moves along the second axis on the second rod 218 under the control of a second belt (not shown in FIG. 2) that extends between a second drive 229 of the second drive motor 222 and the second idler pulley 226. The second drive motor 222 drives the second drive pulley 229 that is drivingly connected to the second idler pulley 226 (e.g., via the second belt not shown in FIG. 2) to move the second sliding guide 228 along the second axis on the second rod 218.

The tool 200 further comprises a third rod 230 that extends along a third axis and at a third distal end 232 is secured to a third drive motor 234. The third drive motor 234 is slidingly secured to the base surface 202 to move perpendicular to the third axis and parallel to the second axis. The third rod 230 includes a third proximate end 235 that is secured to a third idler pulley 236. The third idler pulley 236 is secured to and moves with a fourth sliding guide 252. The third sliding guide 238 moves along the third axis on the third rod 230 under the control of a third belt (not shown in FIG. 2), where the third drive motor 234 drives a third drive pulley 240 that is drivingly connected to the third idler pulley 236 to move the third sliding guide 238 along the third axis on the third rod 230.

A fourth rod 242 extends along a fourth axis and at a fourth distal end 244 is secured to a fourth drive motor 246. The fourth drive motor 246 is slidingly secured to the base surface 202 to move perpendicular to the fourth axis and parallel to the first axis. The fourth rod 242 includes a fourth proximate end 248 is secured to a fourth idler pulley 250. The fourth idler pulley 250 is secured to and moves with the first sliding guide 214. The fourth sliding guide 252 moves along the fourth axis on the fourth rod 242 under the control of a fourth belt (not shown in FIG. 2) that extends between the fourth drive motor 246 and the fourth idler pulley 250. The fourth drive motor 246 drives a fourth drive pulley 254 that is drivingly connected to the fourth idler pulley 250 to move the fourth sliding guide 252 along the fourth axis on the fourth rod 242.

The tool 200 also includes a controller 260 (e.g., a processor) that sends command signals to the first, second, third and fourth motors 208, 222, 234 and 246 to move the guides 214, 228, 238 and 252 along their respective rods 204, 218, 230 and 242. The movement of the guides and the motors may be simultaneous to balance the tension on the film as it is stretched.

In one embodiment, the first rod/axis 204 and the third rod/axis 230 are parallel, and the second rod/axis 218 and the fourth rod/axis 242 are parallel. In addition, each of the first, second, third, fourth rods is positioned in a common plane to stretch the sensor network film in the common plane.

Figure 3:
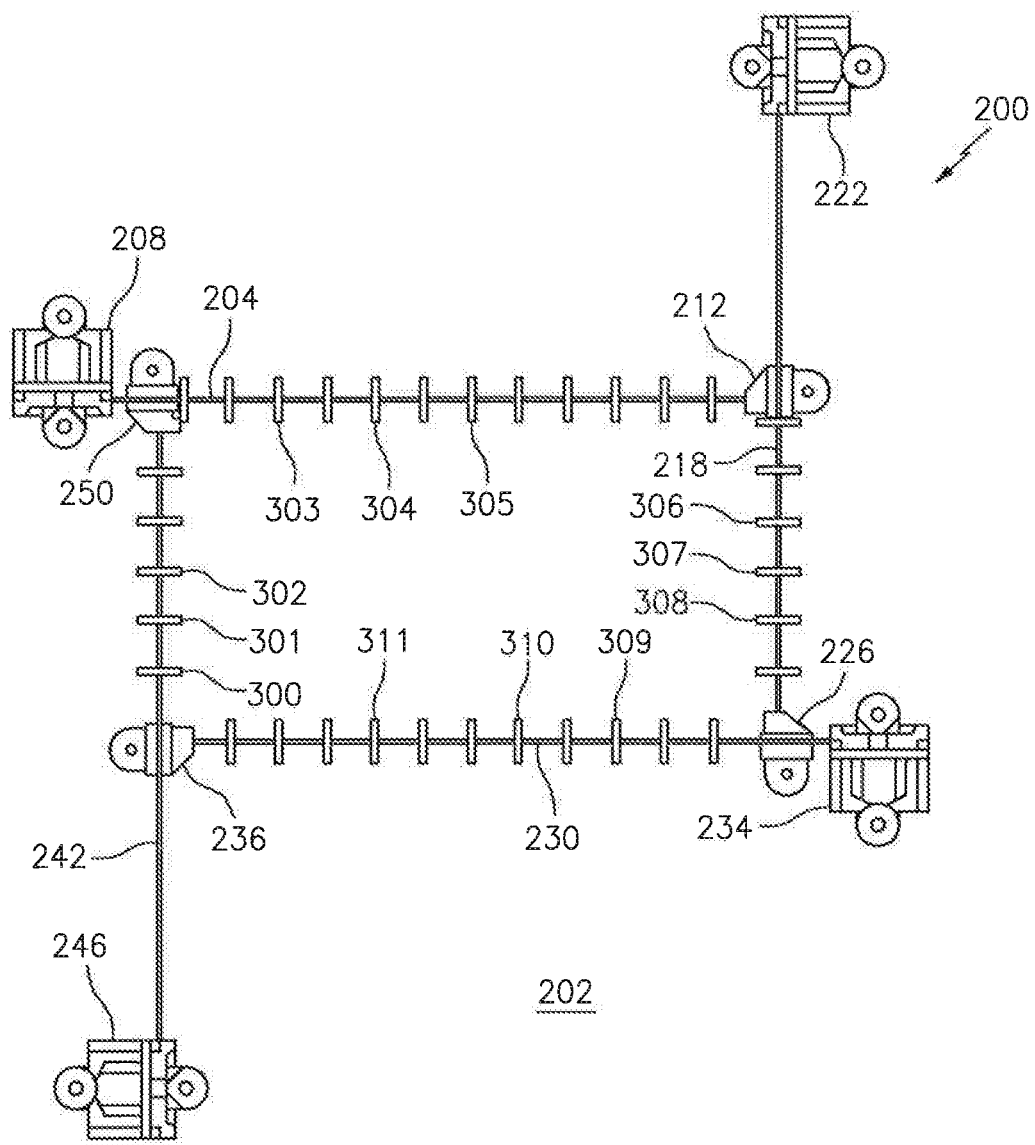
FIG. 3 is a simplified pictorial illustration of the stretching tool mounted on the base surface and in an intermediate position with clips spaced along first, second, third and fourth rods.

FIG. 3 is a simplified pictorial illustration of the stretching tool 200 mounted on the base surface 202 and in an intermediate position with a plurality of clips 300-311 spaced along the first, second, third and fourth rods 202, 218, 230 and 242. Each of the plurality of clips 300-311 are mounted to a respective one of the first, second, third and fourth rods to hold the sensor network film at its periphery and an associated spacing spring (not shown in FIG. 3) is located between adjacent ones of the clips 300-311 on the same of the first, second, third and fourth rods. The springs spread the clips out on its associated one of the first, second, third and fourth rods as the sensor film is stretched.

Figure 4:
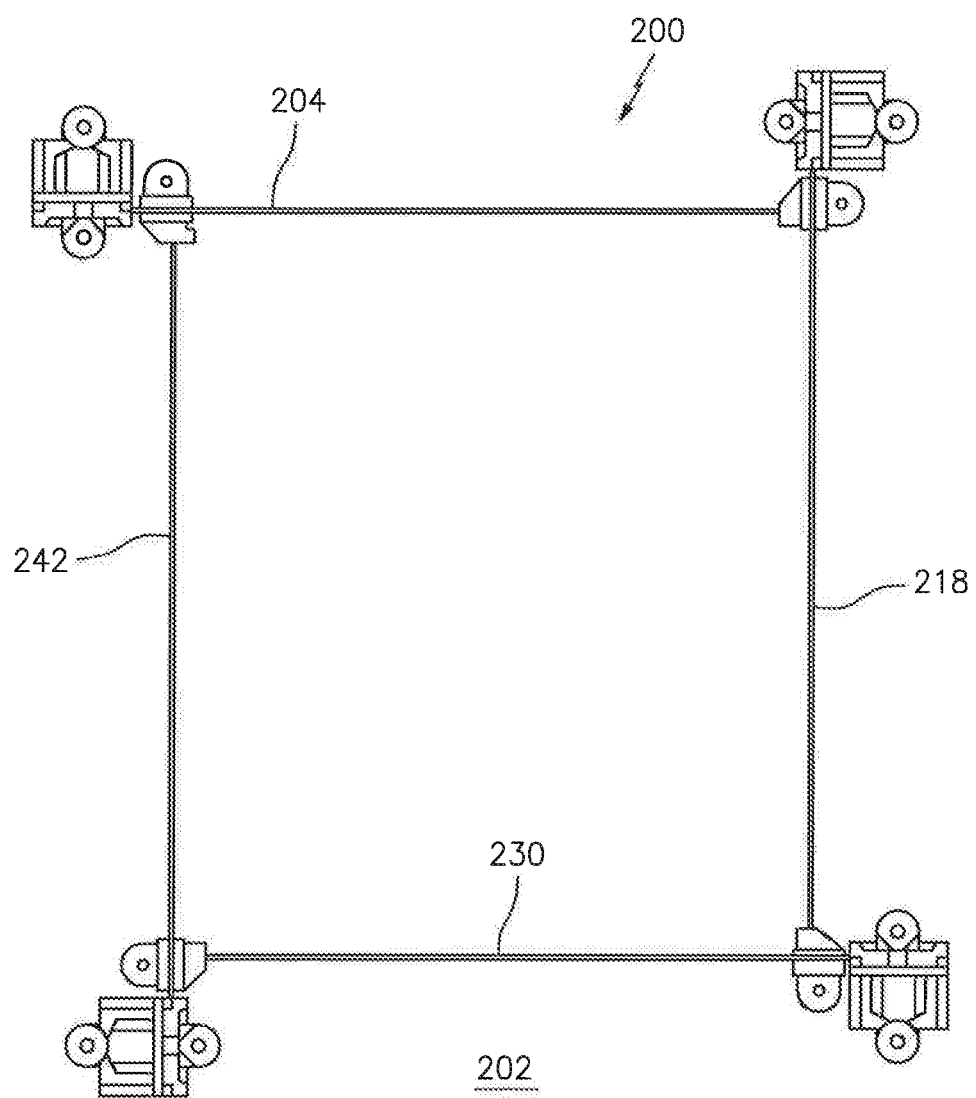
FIG. 4 is a simplified pictorial illustration of the stretching tool in a fully open position with the clips removed.

FIG. 4 is a simplified pictorial illustration of the stretching tool 200 in a fully open position with the clips removed for ease of illustration.

Figure 5:
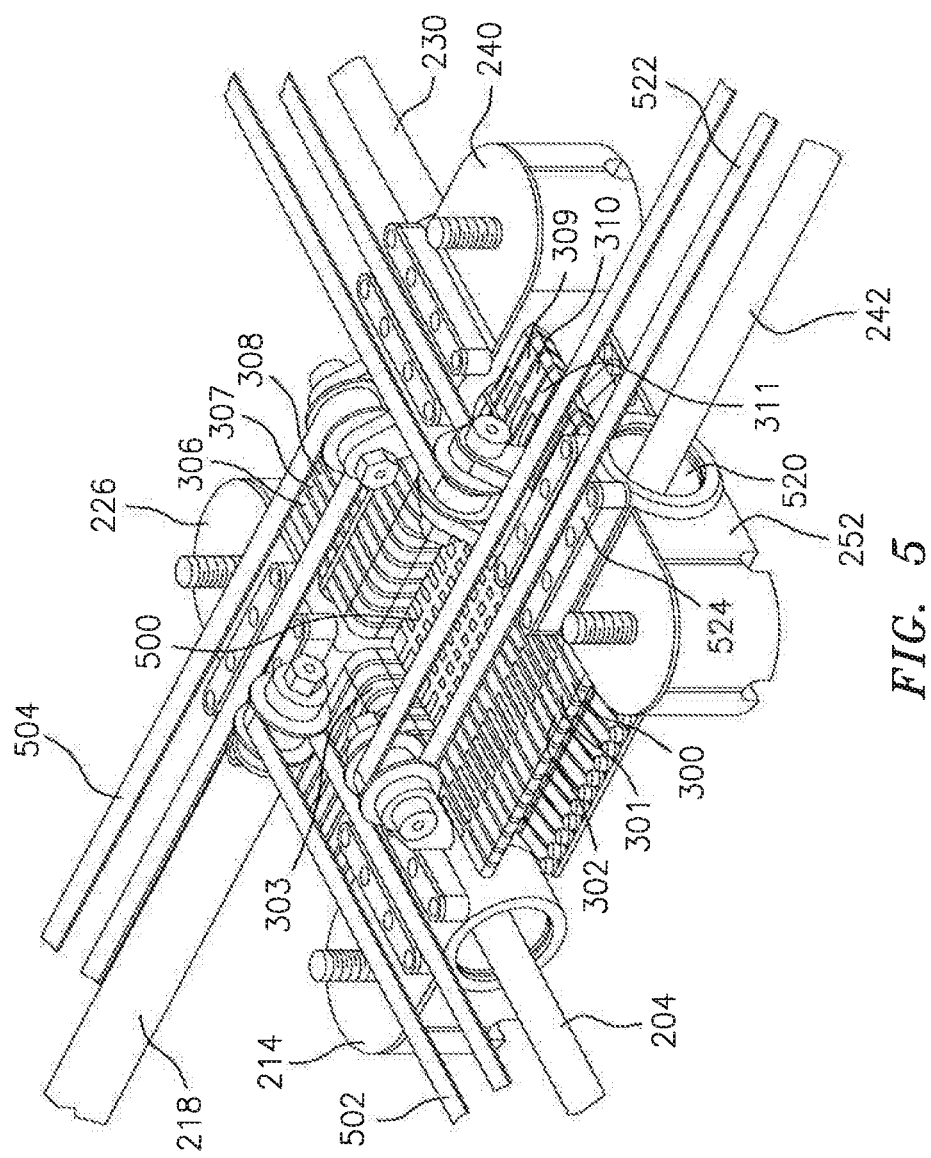
FIG. 5 is an isometric view of the tool with a film secured to the tool by the clips for stretching.
Figure 6:
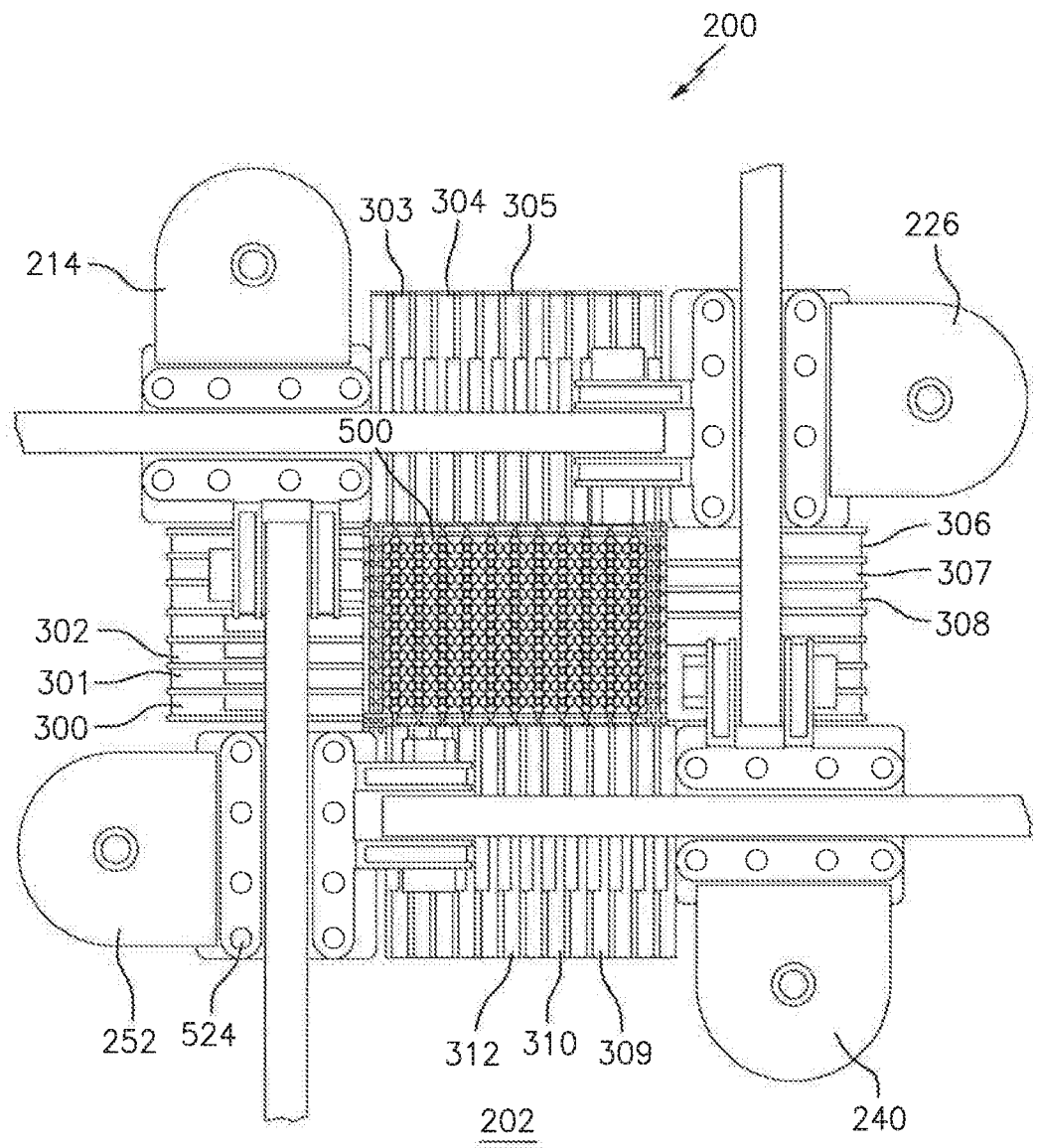
FIG. 6 is a top view of the tool with the film secured to the tool by the clips for stretching.

FIG. 5 is an isometric view of a portion of the tool of FIGS. 2-4 with a film 500 secured to the tool 200 by the plurality of clips (e.g., 300-311) for stretching of the film under the control of the controller 260 (FIG. 2). It is contemplated that the film may be secured to the tool in various ways, including for example, clips, clamps, et cetera FIG. 6 is a top view of the tool 200 of FIGS. 2-5 with the film 500 secured to the tool 200 by the clips 300-311. A first drive belt 502 is coupled between the first drive motor 208 and the first idler pulley 214 to move the first sliding guide 214 along the first rod 204. Similarly, a second drive belt 504 is coupled between the second drive motor 222 and the second idler pulley 226 to move second sliding guide 228 along the second rod 218. The third and fourth rods also include similar belts interconnecting the associated motor and idler pulley for the particular rod.

Referring still to FIG. 5, each of the belts may be connected to its associated guide via a clamp. Each of the guides may include a recess through which its associate rod may pass and ride upon. For example, the fourth rod 242 may pass through a recess 520 and a fourth belt 522 is secured to the fourth sliding guide 252 via a clamp 524. As the fourth motor moves the fourth belt 522 the fourth sliding guide 252 moves along the fourth rod 242.

Figure 7:
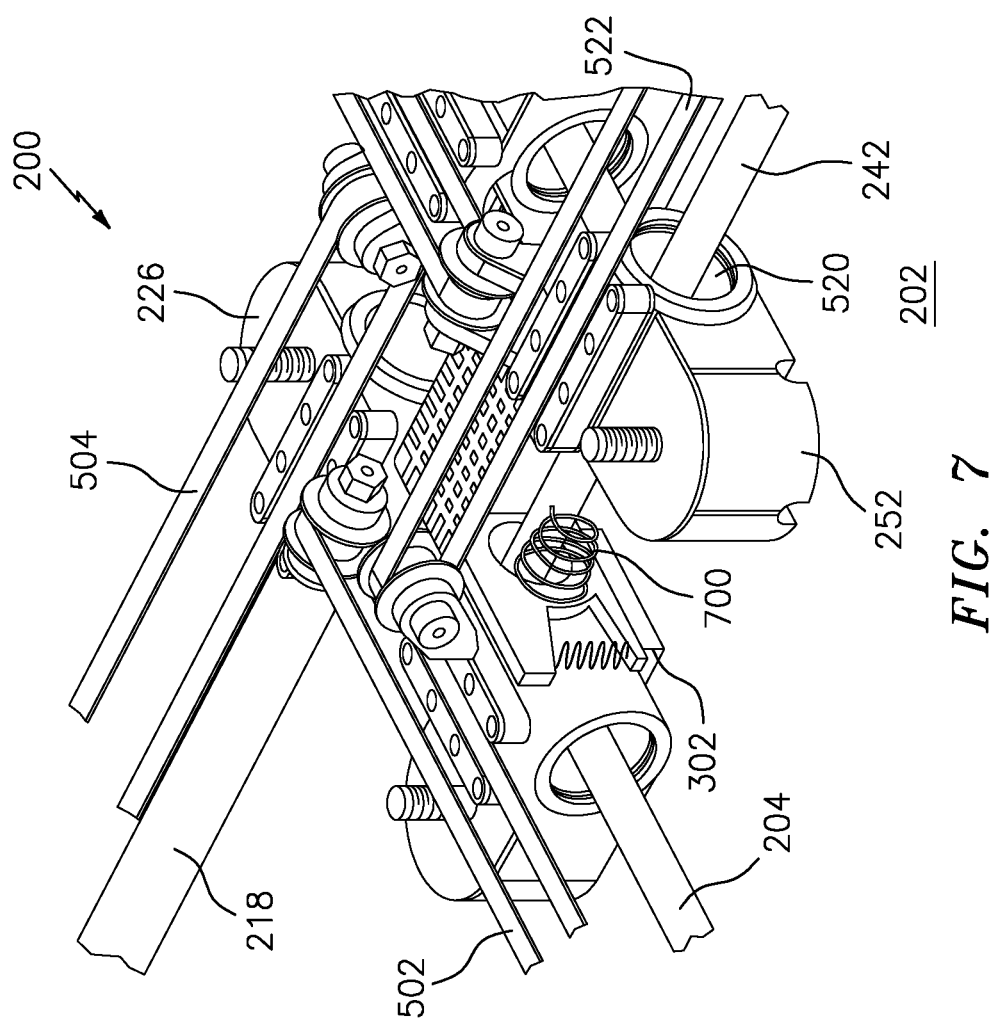
FIG. 7 is an isometric view of the tool with the film secured to the tool by the clips for stretching and showing one clip on the fourth rod with a tapered spring that separates an adjacent clip.

FIG. 7 is an isometric view of the tool 200 with the film 500 secured to the tool by the clips for stretching, but showing one clip 300 on the fourth rod 242 and a spacing spring 700 (e.g., tapered) that separates an immediately adjacent clip (not shown). An associated spacing spring is located between adjacent ones of the clips on the same of the first, second, third and fourth rods in order to spread the clips out on its associated on the first, second, third and fourth rods as the sensor film is stretched by moving each of the first, second, third and fourth sliding guides in the direction of its associated one of the first, second, third, fourth distal end, and at least three of the drive motors. FIG. 3 illustrates the clips equally spaced on their respective rods as a result of forces applied by the spacing springs.

Figure 8:
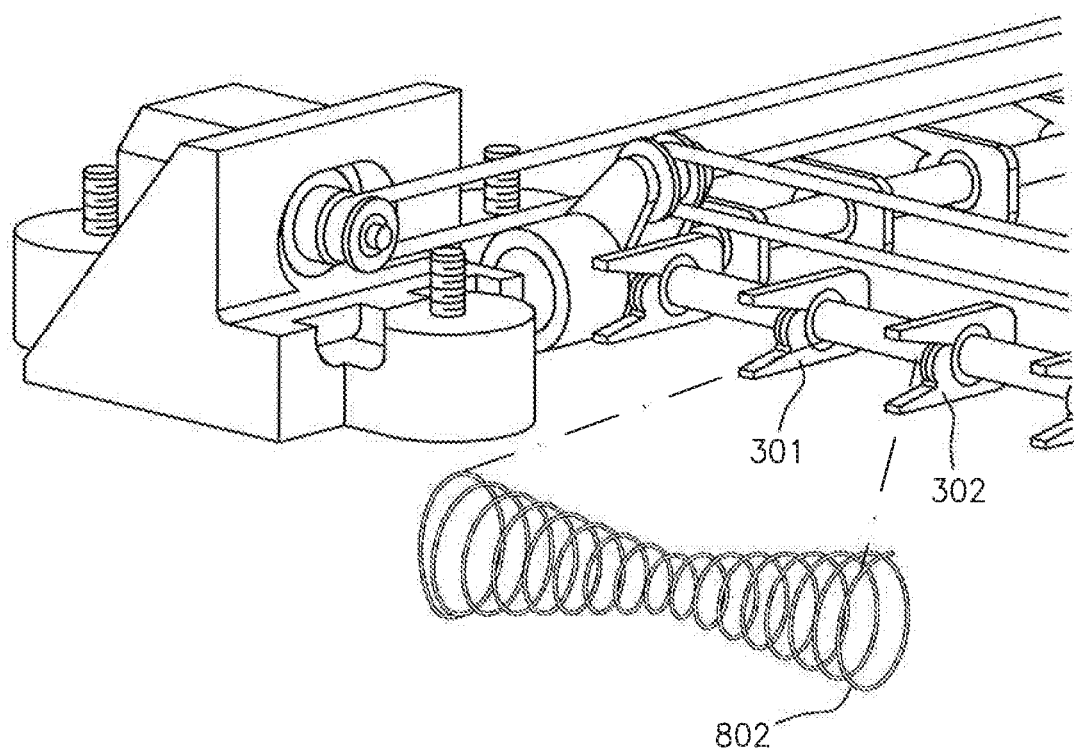
FIG. 8 is an isometric view of a portion of the tool with an hour glass shaped spacing spring located between adjacent clips.

FIG. 8 is an isometric view of a portion of the tool with an hour glass spacing spring 802 located between adjacent clips 301, 302. An hour glass spacing spring is located between adjacent ones of the clips on the first, second, third and fourth rods in order to spread the clips out on its associated one of the first, second, third and fourth rods as the film is stretched by moving each of the first, second, third and fourth sliding guides in the direction of its associated one of the first, second, third, fourth distal end and moving the motors to balance tension on the film as it is stretched. It is contemplated that the spring may have various shapes in order to keep the clips evenly spaced during opening and closing of the tool.

It is contemplated that rather than belts or other linkage to move the sliding guides, that each of the sliding guides may include their own motor in order to control movement of the sliding guide along its associated rod. This embodiment may include first, second, third and fourth drive motors to move the rods and a motor (e.g., stepper or torque) in each of the sliding guides to simultaneously move the sliding guides. Similarly, rather than four drive motors, a single drive motors may be used to move each of the rods, and one or more motors may be used to move the sliding guides along their associated rod.

In one embodiment, to stretch a film, the film (e.g., rectangular) is secured to the clips at the periphery of the film while the tool is in the closed position as illustrated in FIG. 3. Once secured, the controller then commands the first, second, third and fourth motors (e.g., stepper motors) to simultaneously move the first, second, third and fourth sliding guides in the distal direction (i.e., outwardly), which also causes the motors themselves to move. The amount of movement is controlled by the stepper motors and movements are simultaneous in order to balance forces on the film. The clips may be additively manufactured. One or more servo motors may be used than stepper motors. The control of the motors via the controller and arrangement of the tool (e.g., the rods) may be based upon the shape of the film (e.g., square, rectangular, round, oval, et cetera). Once the film is stretched the desired amount various electronic components may then be secured to the film to provide the desired sensor network.

It is contemplated that a single drive motor may be used rather than one for each rod in order to move the slides in order to stretch the film. In this case all but one of the motors may be replaced by slides that move similar to the motors to balance tension on the film as it is stretched. In addition, although the tool is discussed as using rods for the sliding glides to move along, it is contemplated that any carrier may be used such as a rail, triangular cross section structure, et cetera. Similar, although belts are used in the embodiments presented in herein to couple the motors to the glides, it is contemplated that any connection mechanism may be used to transmit the motive force to the sliding guide in order to stretch the film in a controller matter. A skilled person will also appreciate that the film may be attached to the tool a number of different ways.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A tool for stretching a sensor network film, comprising:
   a first rod that extends along a first axis and at a first distal end is secured to a first drive motor that is slidingly secured to a base surface to move perpendicular to the first axis and parallel to a second axis;
   a first idler pulley that is connected to a first proximate end of the first rod;
   a first sliding guide that moves along the first axis on the first rod, where the first drive motor drives a first drive pulley that is drivingly connected to the first idler pulley to move the first sliding guide along the first axis on the first rod;
   a second rod that extends along the second axis and at a second distal end is secured to a second drive motor that is slidingly secured to the base surface to move perpendicular to the second axis and parallel to the first axis;
   a second idler pulley that is connected to a second proximate end of the second rod;
   a second sliding guide that moves along the second axis on the second rod, where the second drive motor drives a second drive pulley that is drivingly connected to the second idler pulley to move the second idler pulley and the second sliding guide along the second axis on the second rod, where the first idler pulley is secured to and moves with the second slide guide;
   a third rod that extends along a third axis and at a third distal end is secured to a third drive motor that is slidingly secured to the base surface to move perpendicular to the third axis and parallel to the second axis;
   a third idler pulley that is secured to a proximate end of the third rod;
   a third sliding guide that moves along the third axis on the third rod, where the third drive motor drives a third drive pulley that is drivingly connected to the third idler pulley to move the third idler pulley and the third sliding guide along the third axis on the third rod, where the second idler pulley is secured to and moves with the third sliding guide;

a fourth rod that extends along a fourth axis and at a fourth distal end is secured to a fourth drive motor that is slidingly secured to the base surface to move perpendicular to the fourth axis and parallel to the first axis;

a fourth idler pulley that is secured to a proximate end of the fourth rod and that is secured to and moves with the first sliding guide; and a fourth sliding guide that moves along the fourth axis on the fourth rod, where the fourth drive motor drives a fourth drive pulley that is drivingly connected to the fourth idler pulley to move the fourth idler pulley and the fourth sliding guide along the fourth axis on the fourth rod, where the third idler pulley is secured to and moves with the fourth sliding guide;

where the first axis and the third axis are parallel, and the second axis and the fourth axis are parallel;

where a plurality of clips are mounted to each of the first, second, third and fourth rods to hold the sensor network film at its periphery.

2. The tool of claim 1, where each of the first, second, third and fourth drive motors comprises a stepper motor.

3. The tool of claim 1, where each of the first, second, third, fourth rods is positioned in a common plane to stretch the sensor network film in the common plane.

4. The tool of claim 3, where a first drive belt is coupled between the first drive motor and the first idler pulley to move the first sliding guide along the first rod.

5. The tool of claim 4, where a second drive belt is coupled between the second drive motor and the second idler pulley to move the second sliding guide along the second rod.

6. The tool of claim 1, further comprising an associated spacing spring located between immediately adjacent ones of the clips on the same of the first, second, third and fourth rods to spread the clips out on its associated one of the first, second, third and fourth rods as the sensor film is stretched by moving each of the first, second, third and fourth sliding guides in the direction of its associated one of the first, second, third, fourth distal ends.

7. A tool for stretching a sensor network film, comprising:
a first rod that extends along a first axis and moves perpendicular to the first axis and along a second axis, a distal end of the first rod secured to a first drive motor;

a first sliding guide that moves along the first axis on the first rod, where the first drive motor drives a first drive pulley that is drivingly connected to a first idler pulley;

a second rod that extends parallel to the second axis and moves perpendicular to the second axis and parallel to the first axis, a distal end of the second rod secured to a second drive motor;

a second sliding guide that moves along the second axis on the second rod, where the second drive motor drives a second drive pulley that is drivingly connected to a second idler pulley and the second sliding guide secured to the first idler pulley;

a third rod that extends along a third axis and moves perpendicular to the third axis and parallel to the second axis, a distal end of the third rod secured to a third drive motor;

a third sliding guide that moves along the third axis on the third rod, where the third drive motor drives a third drive pulley that is drivingly connected to a third idler pulley, the third sliding guide secured to the second idler pulley;

a fourth rod that extends along a fourth axis and moves perpendicular to the fourth axis and parallel to the first axis, a distal end of the fourth rod secured to a fourth drive motor; and a fourth sliding guide that moves along the fourth axis on the fourth rod, where the fourth drive motor drives a fourth drive pulley that is drivingly connected to a fourth idler pulley, the fourth sliding guide secured to the third idler pulley and the first sliding guide secured to the fourth idler pulley;

where the first axis and the third axis are parallel, and the second axis and the fourth axis are parallel.

8. The tool of claim 7, further comprising a plurality of clips mounted to each of the first, second, third and fourth rods to hold the sensor network film at its periphery, and a plurality of spacing springs each uniquely located between adjacent ones of the clips on the same of the first, second, third and fourth rods to spread the clips out on its associated one of the first, second, third and fourth rods as the sensor film is stretched by moving each of the first, second, third and fourth sliding guides and the first, second, third and fourth rods to stretch the sensor network film.

9. The tool of claim 7, further comprising a controller that provides command signals to a plurality of motors, including the first drive motor, the second drive motor, the third drive motor, and the fourth drive motor to simultaneously move each of the first, second, third and fourth rods and the first, second, third and fourth sliding guides to stretch the sensor network film.

10. The tool of claim 9, where each of the plurality motors comprises one of a stepper motor and a torque motor.

11. The tool of claim 7, where each of the first, second, third, fourth rods is positioned in a common plane to stretch the sensor network film in the common plane.

* * * * *